(12) United States Patent
Hartwig

(10) Patent No.: US 9,664,993 B2
(45) Date of Patent: May 30, 2017

(54) LIGHT MODULE FOR A PROJECTION DEVICE, DLP PROJECTOR AND METHOD FOR PRODUCING A DICHROIC MIRROR

(71) Applicant: OSRAM GMBH, Munich (DE)

(72) Inventor: Ulrich Hartwig, Berlin (DE)

(73) Assignee: OSRAM GmbH, Munich (DE)

( * ) Notice: Subject to any disclaimer, the term of this patent is extended or adjusted under 35 U.S.C. 154(b) by 127 days.

(21) Appl. No.: 14/559,693

(22) Filed: Dec. 3, 2014

(65) Prior Publication Data

US 2015/0153636 A1   Jun. 4, 2015

(30) Foreign Application Priority Data

Dec. 3, 2013  (DE) .................. 10 2013 224 768

(51) Int. Cl.
| | |
|---|---|
| G03B 21/28 | (2006.01) |
| G03B 21/20 | (2006.01) |
| G02B 27/10 | (2006.01) |
| G02B 27/14 | (2006.01) |
| G02B 26/00 | (2006.01) |

(52) U.S. Cl.
CPC ......... *G03B 21/28* (2013.01); *G02B 27/1006* (2013.01); *G02B 27/141* (2013.01); *G03B 21/204* (2013.01); *G02B 26/008* (2013.01); *G03B 21/2066* (2013.01)

(58) Field of Classification Search
CPC  G02B 27/1006; G02B 27/141; G02B 26/008; G03B 21/204; G03B 21/28
See application file for complete search history.

(56) References Cited

U.S. PATENT DOCUMENTS

| | | | |
|---|---|---|---|
| 2011/0199580 A1 | 8/2011 | Hirata et al. | |
| 2012/0147332 A1 | 6/2012 | Huang | |
| 2013/0088471 A1* | 4/2013 | Kitano | ................. H04N 9/3114 345/208 |

FOREIGN PATENT DOCUMENTS

| | | |
|---|---|---|
| DE | 60129394 | 10/2007 |
| DE | 102010001942 | 8/2011 |
| DE | 102010001945 | 8/2011 |
| DE | 102012200011 | 7/2013 |

(Continued)

*Primary Examiner* — Sultan Chowdhury
*Assistant Examiner* — Magda Cruz
(74) *Attorney, Agent, or Firm* — Cozen O'Connor

(57) ABSTRACT

A light module comprises first excitation radiation source emitting first excitation radiation having a first optical property value, second excitation radiation source emitting second excitation radiation having a second optical property value which differs from the first value. At irradiation region (P), a phosphor and an optical element, which is at least partly reflective with maintenance of the optical property, are arranged alternately or simultaneously. A first dichroic mirror is arranged between the first excitation radiation source and irradiation region (P), and a second dichroic mirror is arranged between the second excitation radiation source and irradiation region (P). The first optical path proceeding from the first excitation radiation source successively comprises the first dichroic mirror, irradiation region (P) and the second dichroic mirror. The second optical path proceeding from the second excitation radiation source successively comprises the second dichroic mirror, irradiation region (P) and the first dichroic mirror.

10 Claims, 3 Drawing Sheets

(56) References Cited

FOREIGN PATENT DOCUMENTS

DE 102012201790 8/2013
WO WO 2012/103919 8/2012

\* cited by examiner

LIGHT MODULE FOR A PROJECTION DEVICE, DLP PROJECTOR AND METHOD FOR PRODUCING A DICHROIC MIRROR

RELATED APPLICATIONS

This application claims the priority of German application no. 10 2013 224 768.0 filed Dec. 3, 2013, the entire content of which is hereby incorporated by reference.

FIELD OF THE INVENTION

The present invention relates to an improved light module that provides a blue light for a projection device, such as without requiring a blue path. The invention also relates to a DLP projector for projecting at least one image onto a projection surface comprising at least one light module of this type, and to a method for producing a dichroic mirror.

BACKGROUND OF THE INVENTION

Blue light is required in many embodiments of LARP (Laser Activated Remote Phosphor) projection light sources. The so-called blue path usually begins at the phosphor, which is also often embodied in the form of a phosphor wheel, wherein the blue light is guided around the phosphor wheel in order to superimpose it with the light converted by the phosphor. A blue path realized in this way is disadvantageous since it requires additional space and as a result has a negative impact in terms of the production costs. Particularly for realizing light modules that are as compact as possible, for example for mobile applications, it is desirable to circumvent this blue path. One known possibility for avoiding the blue path consists in the use of polarization-rotating elements. In this case, by way of example, the excitation light is radiated via a dichroic mirror and a $\lambda/4$ plate onto a segment of the phosphor wheel that is not coated with phosphor. After passing through the $\lambda/4$ plate twice, the polarization of the blue light has rotated and can then be deflected by a dichroic beam splitter of corresponding design. The disadvantage of this solution is that polarization-rotating elements, in particular the $\lambda/4$ plates used for rotating the polarization of the excitation radiation, are expensive, however, and their use is therefore undesirable.

In another solution, a reduced etendue of the excitation source(s) emitting blue light is utilized. In order to utilize this concept with the arrangement of a light module 10 as illustrated in FIG. 1, by way of example, the dichroic mirror 12 would have to be embodied as transmissive to blue light, which then impinges on an at least partly reflective optical element 16 arranged on an optical axis 14 in an irradiation region P. After the reflection of said light, a further dichroic mirror 18 would have to be implemented to reflect this blue light. In order for this arrangement to be suitable for realizing the concept mentioned, the etendue of an excitation radiation source 22 emitting the excitation radiation 20 would accordingly have to be halved, i.e. in such a way that the excitation radiation 20 emitted by the excitation radiation source 22 impinges only on the dichroic mirror 12 but not on the dichroic mirror 18, since this portion would otherwise be lost. A reduction of the etendue is undesirable however, since excitation radiation sources with reduced etendue are associated with an undesirable reduction of permissible tolerances in the event of an increase in the excitation requirement.

SUMMARY OF THE INVENTION

One object of the present invention is to provide a generic light module in such a way that prevention of the blue path is made possible, but manages to do so without the use of expensive $\lambda/4$ plates and is not associated with a reduced etendue.

Another object is to provide a DLP projector for projecting at least one image onto a projection surface comprising at least one light module of this type, and a method for producing a dichroic mirror.

These and other objects can be attained in accordance with one aspect of the present invention directed to a light module for a projection device comprising a first excitation radiation source, which is configured to emit a first excitation radiation having at least one first value of an optical property; a second excitation radiation source, which is configured to emit a second excitation radiation having at least one second value of an optical property, wherein the second value differs from the first value; at least one phosphor adapted to convert the first excitation radiation into a first conversion radiation and the second excitation radiation into a second conversion radiation; a first dichroic mirror, which is arranged in the beam path between the first excitation radiation source and a predefinable irradiation region; a second dichroic mirror, which is arranged in the beam path between the second excitation radiation source and the predefinable irradiation region; a first focusing device, which is arranged in the beam path between the first dichroic mirror and the predefinable irradiation region; a second focusing device, which is arranged in the beam path between the second dichroic mirror and the predefinable irradiation region; an output at which the first and the second conversion radiation can be provided; at least one optical element which is at least partly reflective with maintenance of the respective value of the at least one optical property of the first and the second excitation radiation and which can be arranged at the predefinable irradiation region at least during predefinable time periods wherein the first optical path proceeding from the first excitation radiation source successively comprises the first dichroic mirror, the first focusing device, the predefinable irradiation region, the second focusing device and the second dichroic mirror, wherein the second optical path proceeding from the second excitation radiation source successively comprises the second dichroic mirror, the second focusing device, the predefinable irradiation region, the first focusing device and the first dichroic mirror.

With this aspect of the present invention, the objects can be achieved if the first and second excitation radiation sources each have an optical property whose value differs from one another. In this way, the first and second dichroic mirrors can be implemented to treat the first and the second excitation radiation differently using these different values of the optical property, i.e. to reflect or to transmit said radiation in an envisaged manner.

A greater etendue of the excitation radiation source leads to a larger pump spot on the phosphor. The size of the source therefore changes, and thus so does the luminance. Luminance is an important variable for applications in which radiation has to pass through a small aperture with a limited solid angle. In projection the situation is that ultimately radiation that arises outside a predefinable rectangle on the phosphor is lost and, consequently, does not contribute to the luminous flux on the projection screen.

The etendue can be halved by the reduction of tolerances in the excitation radiation source. With the use of laser diodes as pump source, primarily the positioning of the collimation lenses is critical. The latter have to be positioned at a highly defined distance and in a centered manner with respect to the optical axis (defined by the centroid of the laser emission on the laser diode facet and the main emission direction of the laser diode) with small deviations and tilting. A stepped mirror is often used, the mirror segments of which have to lie at defined angles at defined positions in order to further unite the radiation field. Here, too, the tolerances are critical. This "compression" of the rays can also be designed more narrowly if small tolerances are already attained during the collimation. The area through which the rays are passed thus decreases. With the area, the possible etendue of the pump source correspondingly decreases as well.

This aspect of the invention makes it possible to avoid λ/4 plates, since it is no longer necessary, in principle, to rotate the polarization between the dichroic mirrors and the irradiation region P. Furthermore, a reduction of the etendue can be dispensed with, with the result that a light module according to the invention is distinguished by a high tolerance independence even in the case of stringent excitation requirements. If blue light, for example having a wavelength of 450 or 465 nm, is used as excitation radiation, the reflected excitation radiation is available for a blue channel.

Particularly preferably, the at least one optical property constitutes the wavelength and/or the polarization. Excitation radiations having different polarization can be generated without the use of λ/4 plates or λ/2 plates by the respective excitation radiation source itself being rotated by 90°.

In one preferred embodiment it is provided that in the respective optical path one of the two dichroic mirrors is impinged on transmissively, and the other reflectively.

Particularly advantageously, the first and the second excitation radiation, on the one hand, and the first and the second conversion radiation at the output run at an angle of ≤10°, preferably ≤5°, with respect to the optical axis. Particularly compact light modules of small design according to the invention can be realized as a result.

In one preferred embodiment, the first focusing device is designed to direct the first excitation radiation onto the predefinable irradiation region at a predefinable angular range and to deflect the second conversion radiation such that it impinges on the first dichroic mirror at an angle of 45°, while the second focusing device is designed to direct the second excitation radiation onto the predefinable irradiation region at the predefinable angular range, but with an opposite sign, and to deflect the first conversion radiation such that it impinges on the second dichroic mirror at an angle of 45°. In this way, the same optical system, in particular lens system, can be used as first and second focusing devices. Said angular range is then 0 to 45°, for example, since an angular spectrum is always present behind a lens on account of the different variation of the angles by the lens.

Preferably, the first dichroic mirror is arranged in a manner tilted by 45° relative to the beam path of the first excitation radiation emitted by the first excitation radiation source, while the second dichroic mirror is arranged in a manner tilted by 45° relative to the beam path of the second excitation radiation emitted by the second excitation radiation source. In this way, the invention can be realized with a minimal number of optical components, as a result of which it can be realized firstly extremely compactly and secondly particularly cost-effectively.

In principle, two essential variants can be differentiated in the realization: in a first variant, the excitation radiations pass through the respective dichroic mirror, whereas the respective conversion radiation is reflected, while in a second variant, the excitation radiations are reflected at the dichroic mirrors, whereas the conversion rays generated therefrom pass through the respective dichroic mirror. In this respect, in the first variant, a first coating of the first dichroic mirror is designed to transmit the first excitation radiation and to reflect the second excitation radiation, wherein a second coating of the first dichroic mirror is designed to reflect the second conversion radiation and the second excitation radiation. A first coating of the second dichroic mirror is designed to transmit the second excitation radiation and to reflect the first excitation radiation, whereas a second coating of the second dichroic mirror is designed to reflect the first conversion radiation and the first excitation radiation.

In the second variant, a first coating of the first dichroic mirror is designed to reflect the first excitation radiation and to transmit the second excitation radiation, wherein a second coating of the first dichroic mirror is designed to transmit the second conversion radiation and the second excitation radiation. A first coating of the second dichroic mirror is designed to reflect the second excitation radiation and to transmit the first excitation radiation, whereas a second coating of the second dichroic mirror is designed to transmit the first conversion radiation and the first excitation radiation.

The first and second coatings are preferably applied on respective sides of the respective dichroic mirror.

In both variants, however, the excitation radiation separating property and the conversion radiation separating property can also be combined in a single complex coating, which is then to be applied only on one side of the respective dichroic mirror. The respective other side is then preferably merely provided with an antireflection coating.

In both variants, the first and/or the second dichroic mirror can have a scattering structure on the first side and/or the second side. The scattering angle is preferably ≤8°, preferably ≤3°. As a result of the scattering of the excitation radiation, the latter can be adapted to the more widely scattered conversion radiation. As a result of this measure, the excitation radiation and the conversion radiation acquire similar angular properties, as a result of which the radiation provided at the output of a light module according to the invention is distinguished by a high quality.

Furthermore, it is preferred if the transmissive coatings of the first and/or second dichroic mirror are coated with an antireflective layer for the respective radiation, wherein the reflective coatings of the first and/or second dichroic mirror are coated with a highly reflective layer for the respective radiation. Losses are effectively avoided in this way, as a result of which a particularly high efficiency can be realized.

The first and second dichroic mirrors can be separate dichroic mirrors. Particularly advantageously, however, the first and second dichroic mirrors are embodied in an integral fashion and constitute different regions of one and the same dichroic mirror. This affords the advantage that only one mirror has to be aligned and fixed during mounting, which results in a time saving and hence in a cost saving.

In accordance with another aspect of the present invention, the latter also relates to a DLP projector for projecting at least one image onto a projection surface comprising at least one light module according to the invention. The preferred embodiments presented with regard to the light module according to the invention and their advantages accordingly correspondingly also apply to a DLP projector according to the invention.

Particularly preferably, the DLP projector comprises a multiplicity of segments, wherein the at least one phosphor is arranged in at least one first segment, wherein the at least one at least partly reflective optical element is arranged in at least one second segment. In this case, the segments can be arranged in a static or dynamic fashion.

In the last-mentioned case, a phosphor wheel can be provided, on which the at least one first segment and the at least one second segment are arranged.

In accordance with a first variant, the multiplicity of segments are embodied as separate radial sectors arranged successively in the circumferential direction. Alternatively, the multiplicity of segments can be arranged in a mixed manner within at least one radial sector. While time slots in which the pure excitation radiation is available at the output occur in the case of the first variant, said radiation always occurs in a manner mixed with the conversion radiation in the case of the second variant.

In accordance with another aspect of the present invention, the latter relates to a method for producing a dichroic mirror, wherein the method comprises the following steps: firstly, a substrate is provided. A first and a second partial region of the substrate are then defined. In a subsequent step, the first partial region is printed with a covering layer. The substrate is thereupon coated with a layer having predefinable reflection/transmission properties. In a subsequent step, the covering layer is removed from the first partial region and then the second partial region is printed with a covering layer. The substrate is then coated again with a layer having predefinable reflection/transmission properties and, finally, the covering layer is removed from the second partial region. In this way, it is possible to produce a dichroic mirror which can be used particularly advantageously in a light module according to the invention. During the production of the rear sides, it is possible to adopt a procedure corresponding to that during the production of the front sides.

Steps for applying layers having predefinable scattering properties can follow in each case. Preferably, however, the surfaces of the substrate are first structured, for example by etching, sandblasting, grinding and the like. Subsequent polishing processes can then achieve the effect that the surfaces can be coated afterward with layers that change the reflection/transmission properties in a desired manner.

By virtue of a dichroic mirror produced in this way, it is possible to halve the alignment and mounting outlay during the construction of a light module according to the invention, in comparison with two separate dichroic mirrors.

BRIEF DESCRIPTION OF THE DRAWINGS

Exemplary embodiments of the present invention will now be described in greater detail below with reference to the accompanying drawings, in which.

DETAILED DESCRIPTION OF THE DRAWINGS

In the following description of the figures, the same reference signs are used for identical and identically acting elements. Said reference signs are introduced only once for the sake of clarity.

Figure 1:
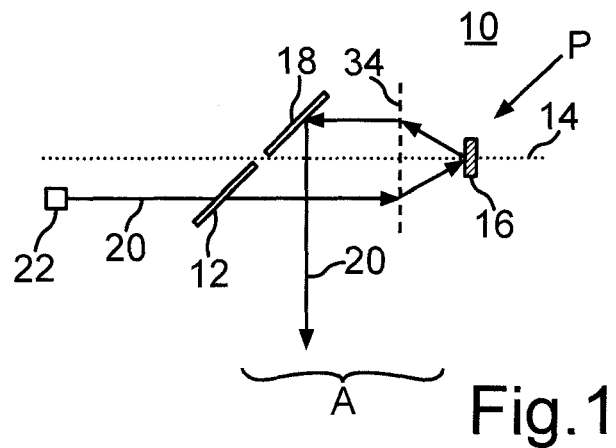
FIG. 1 shows in schematic illustration one exemplary embodiment of a light module according to the invention, wherein an at least partly reflective optical element is arranged in the irradiation region P for the purpose of elucidating the optical path proceeding from the first excitation radiation source.
Figure 2:
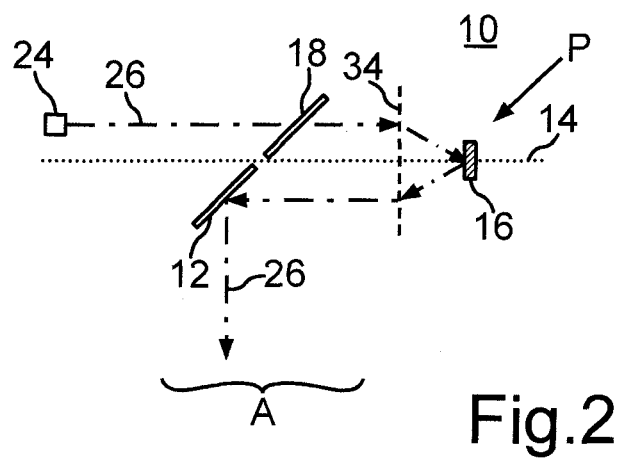
FIG. 2 shows in schematic illustration the exemplary embodiment from FIG. 1, wherein an at least partly reflective optical element is arranged in the irradiation region P for the purpose of elucidating the optical path proceeding from the second excitation radiation source.
Figure 3:
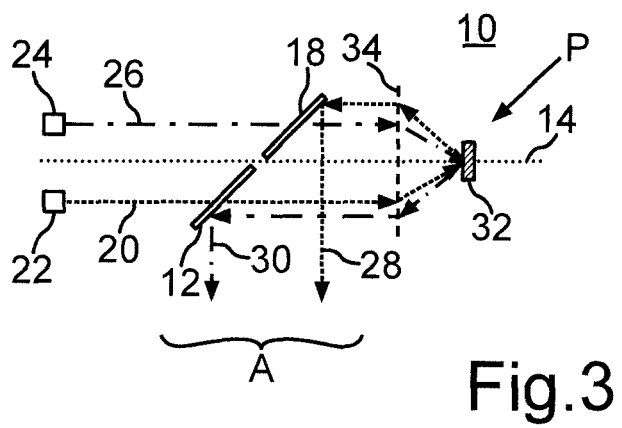
FIG. 3 shows in schematic illustration a combination of the exemplary embodiments from FIG. 1 and FIG. 2, wherein a phosphor is arranged in the irradiation region P for the purpose of elucidating the arising of the respective conversion radiation.

FIGS. 1, 2 and 3 show in schematic illustration the concept underlying the invention: FIGS. 1 and 2 show how the situation is achieved that first and second excitation radiation 20, 26 respectively emitted by a first and a second excitation radiation source 22, 24 is provided at the output A of the light module 20, while FIG. 3 shows how the corresponding conversion radiations 28, 30 are generated and provided at the output A.

The excitation radiation sources (pump light sources) 22 and generate spatially separate, virtually parallel radiation having a divergence of ≤10°, preferably ≤4°, with different values of at least one optical property. Optical properties taken into consideration are the wavelength or the polarizations or both. In one preferred exemplary embodiment, the wavelength of one of the two excitation radiation sources is 450 nm and that of the other is 465 nm. The two dichroic mirrors 12, 18 are preferably realized by a single dichroic mirror, which then has a first partial region 12 and a second partial region 18.

The first dichroic mirror 12 is transparent, i.e. transmissive, to the first excitation radiation 20 emitted by the first excitation radiation source 22 and reflective for the second excitation radiation 26 emitted by the second excitation radiation source 24. The second dichroic mirror 18 is transparent, i.e. transmissive, to the second excitation radiation 26 emitted by the second excitation radiation source 24 and reflective for the first excitation radiation 20 emitted by the first excitation radiation source 22.

Both dichroic mirrors 12, 18 are highly reflective for the respective conversion radiation 28, 30. In one preferred embodiment, the latter has a wavelength of between 480 and 700 nm.

An at least partly, in particular completely, reflective optical element 16 is used in FIGS. 1 and 2, said optical element maintaining the respective value of the at least one optical property and being arranged on the optical axis 14 in a region P. In the illustration in FIG. 3, said at least partly reflective optical element 16 is replaced by a phosphor 32.

A focusing device 34 is arranged between the dichroic mirror 12, 18 and the at least partly reflective optical element 16 or the phosphor 32.

If the at least partly reflective optical element 16 is arranged in the irradiation region P, the following results:

The first excitation radiation 20 is emitted by the first excitation radiation source 22, passes through the dichroic mirror 12 and subsequently through the focusing device 34, is reflected by the at least partly reflective optical element 16 with the value of its optical property being maintained, passes through the focusing device 34 again and is subsequently reflected by the dichroic mirror 18.

Conversely, the second excitation radiation 26 starts at the second excitation radiation source 24, passes through the dichroic mirror 18 and subsequently the focusing device 34, is reflected by the at least partly reflective optical element 16 with the value of its optical property being maintained, passes through the focusing device 34 again and is subsequently reflected by the dichroic mirror 12 to the output A.

As already mentioned, FIG. 3 shows the arrangement if, instead of the at least partly reflective optical element 16, a phosphor 32 is arranged at the irradiation region P. It generally holds true that the at least partly reflective optical element 16 and the phosphor 32 can be arranged simultaneously or serially in the irradiation region P.

In the case where at any rate at least one phosphor 32 is arranged in the irradiation region P, the first excitation radiation 20 emitted by the first excitation radiation source 22 is converted in the phosphor 32 into a first conversion radiation 28, which passes through the focusing device 34 and is subsequently reflected at the dichroic mirror 18 to the output A. Conversely, the second excitation radiation 26 emitted by the second excitation radiation source 24 is converted by the phosphor 32 into a second conversion radiation 30, passes through the focusing device 34 and is subsequently reflected at the dichroic mirror 12 to the output A.

If an at least partly reflective optical element 16 and a phosphor 32 are positioned alternately at the position P or if a mixture of at least partly reflective constituents 16 or phosphor constituents 32 is arranged at the position P, then both the first and the second excitation radiation 20, 26 and the first and the second conversion radiation 28, 30 are available at the output A.

Figure 4:
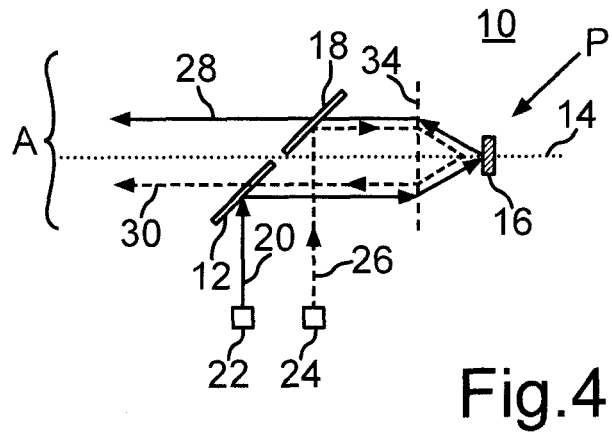
FIG. 4 shows in schematic illustration a further exemplary embodiment of a light module according to the invention, wherein an at least partly reflective optical element is arranged in the irradiation region P for the purpose of elucidating the optical path proceeding from the first excitation radiation source.
Figure 5:
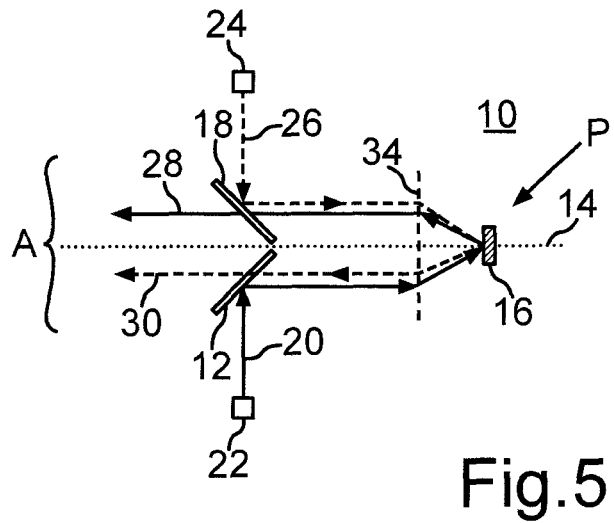
FIG. 5 shows in schematic illustration yet another exemplary embodiment of a light module according to the invention, wherein an at least partly reflective optical element is arranged in the irradiation region P for the purpose of elucidating the optical path proceeding from the first excitation radiation source.
Figure 6:
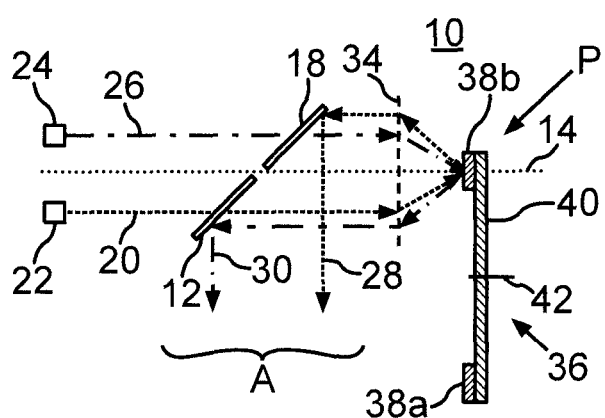
FIG. 6 corresponds to the arrangement from FIG. 3, but now the phosphor is arranged on a phosphor wheel.

FIGS. 4 and 5 show in schematic illustration further exemplary embodiments of light modules 10 according to the invention. In both arrangements, the respective excitation radiation 20, 26 is now reflected at the respective dichroic mirror 12, 18. For the respective conversion radiation 28, 30, which is not depicted for the sake of clarity, a corresponding course arises, such that here, too, both excitation radiation 20, 26 and conversion radiation 28, 30 are available at the output A. (For the arising of the conversion radiation 28, 30, it is necessary, of course, to provide a phosphor 32 or phosphor constituents 32 at the irradiation region P.)

While the feeding of the excitation radiation 20, 26 takes place from the same side in the exemplary embodiment in FIG. 4, it takes place from opposite sides in the embodiment in accordance with FIG. 5.

In the embodiments illustrated in FIGS. 4 and 5, the dichroic mirror 12 reflects the first excitation radiation 20, but transmits the second excitation radiation 26 and the second conversion radiation 30. The dichroic mirror 18 reflects the second excitation radiation 26 and transmits the first excitation radiation 20 and the first conversion radiation 28.

As already mentioned, the at least one phosphor 32 and the at least partly reflective optical element 16 can be arranged in a static or movable fashion at the irradiation region P. Particularly for realizing a DLP projector, it is preferred if sequentially different phosphors for realizing different colors are arranged at the irradiation region P.

In this context, consideration is given to the use of a phosphor wheel 36, in which different segments 38*i* applied to a phosphor wheel substrate 40 at different positions in the circumferential direction are arranged sequentially at the irradiation region P by the rotation of the phosphor wheel 36 about a phosphor wheel axis 42.

Figure 7:
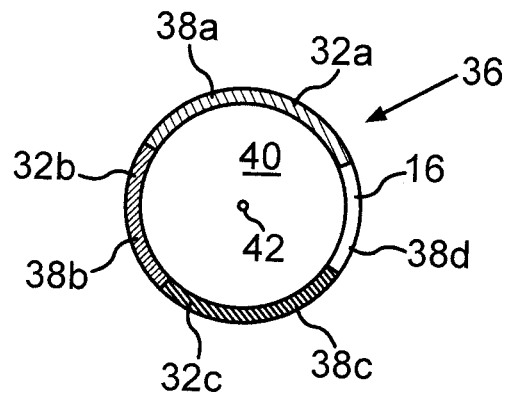
FIG. 7 shows in schematic illustration a side view of a first exemplary embodiment of a phosphor wheel that can be used in the embodiment illustrated in FIG. 6.

In accordance with a first embodiment illustrated schematically in FIG. 7, the phosphor wheel 13 can comprise a multiplicity of segments 38*a* to *d*, wherein different phosphors 32*a*, 32*b*, 32*c* are arranged in some segments 38*a*, 38*b*, 38*c*, while one segment 38*d*, with the maintenance of the respective value of the at least one optical property, is embodied as reflective for the first and the second excitation radiation 20, 26, that is to say has the at least partly reflective optical element 16. Preferably, the phosphors 32*a*, 32*b*, 32*c* differ in the wavelength of the conversion light generated with their aid.

The different phosphors 32*a*, 32*b*, 32*c* and the at least partly reflective layer 16 can be embodied as slightly scattering, in particular with a scattering angle of <10°. When the phosphor wheel 36 rotates, the radiation emitted by the different segments 38*a* to *d* is thus obtained sequentially.

As already mentioned, it is important that the property (wavelength and/or polarization) of the respective excitation radiation 20, 26 is maintained at the reflective segment 38*d*.

Figure 8:
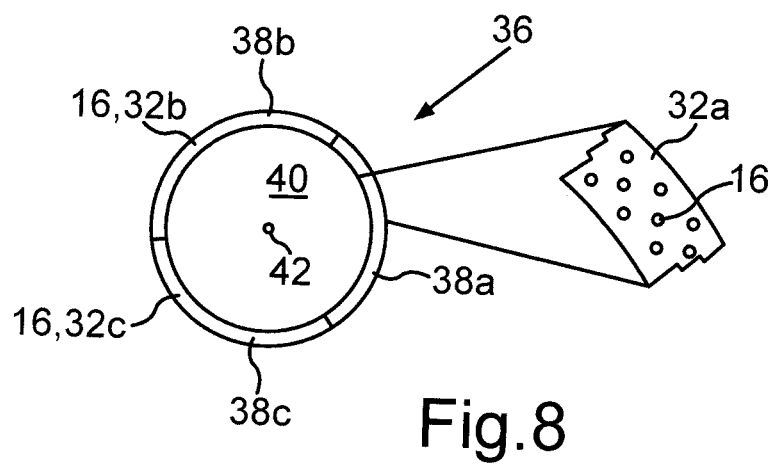
FIG. 8 shows in schematic illustration a side view of a second exemplary embodiment of a phosphor wheel that can be used in the embodiment illustrated in FIG. 6.

A second embodiment of a phosphor wheel 36 is illustrated in FIG. 8. This phosphor wheel 36 serves for white light generation, in particular. It comprises three segments 38*a*, 38*b*, 38*c*, wherein respective constituents of a phosphor 32*a*, 32*b*, 32*c* and at least partly reflective constituents 16 are present in the respective segment 38*a*, 38*b*, 38*c*. In contrast to FIG. 7, here the phosphors 32*a*, 32*b*, 32*c* and the reflective constituents 16 are arranged in a mixed manner within radial sectors 38*a*, 38*b*, 38*c*.

The phosphor wheel 13 illustrated in FIG. 8 is particularly advantageous in particular in the case of single-color solutions in which the excitation radiation is also intended to be concomitantly mixed into the color, for example in the case of white light. The reflective constituents 16 can be produced by cutouts of the respective phosphor layers 32*a*, 32*b*, 32*c*, such that the conversion light 28, 30 from a phosphor 32*a*, 32*b*, 32*c* mixes with respect to the excitation radiation 20, 26. The cutouts are shown as round in the illustration in FIG. 8. However, other patterns, for example rectangles, strips, curves, can also be used. Moreover, it is possible to use a very thin phosphor layer that is partly transparent. The latter can also be realized, in particular, with a ceramic phosphor, including in a static phosphor arrangement.

Figure 9:
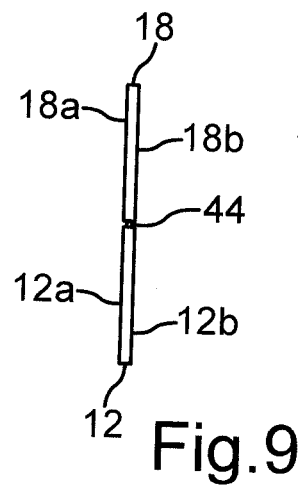
FIG. 9 shows in schematic illustration in side view a dichroic mirror that can be used in the exemplary embodiments in accordance with FIG. 1 to FIG. 6.

FIG. 9 shows a dichroic mirror in which the dichroic mirrors 12, 18 are embodied integrally on a substrate with an interface 44. In this case, front (entrance) side and/or rear side 12*a*, 12*b*, 18*a*, 18*b* can have a scattering structure. As a result, the excitation radiation, before it enters the light module, is scattered again and can thus be adapted to the more widely scattered conversion radiation. Furthermore, an antireflection layer for the respective excitation radiation can be provided in each case on the entrance side of the respective partial region 12, 18. A highly reflective layer for the respective other excitation radiation and the converted light is preferably provided on the rear side.

In order to produce such a dichroic mirror having two partial regions 12, 18, firstly a mirror substrate is provided and the first and second partial regions 12, 18 of the substrate are defined. The first partial region 12 is subsequently printed with a covering layer. The substrate is then coated with a layer having predefinable reflection/transmission properties and the covering layer is subsequently removed again from the first partial region 12. Afterward, the second partial region 18 is printed with a covering layer and the substrate is coated with a further layer having predefinable reflection/transmission properties. Finally, the covering layer is removed again from the second partial region 18.

As an alternative to the dichroic mirror having two partial regions 12, 18 as illustrated in FIG. 9, it is also possible to use two separate dichroic mirrors 12, 18 in a light module 10 according to the invention.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A light module for a projection device comprising:
a first excitation radiation source, which is configured to emit a first excitation radiation having at least one first value of an optical property;
a second excitation radiation source, which is configured to emit a second excitation radiation having at least one second value of an optical property, wherein the second value differs from the first value;
at least one phosphor adapted to convert the first excitation radiation into a first conversion radiation and the second excitation radiation into a second conversion radiation;
a first dichroic mirror, which is arranged in the beam path between the first excitation radiation source and a predefinable irradiation region;
a second dichroic mirror, which is arranged in the beam path between the second excitation radiation source and the predefinable irradiation region;
a first focusing device, which is arranged in the beam path between the first dichroic mirror and the predefinable irradiation region;
a second focusing device, which is arranged in the beam path between the second dichroic mirror and the predefinable irradiation region;
an output at which the first and the second conversion radiation can be provided; and
at least one optical element which is at least partly reflective with maintenance of the respective value of the at least one optical property of the first and the second excitation radiation and which can be arranged at the predefinable irradiation region at least during predefinable time periods,
wherein the first optical path proceeding from the first excitation radiation source successively comprises the first dichroic mirror, the first focusing device, the predefinable irradiation region, the second focusing device and the second dichroic mirror, and
wherein the second optical path proceeding from the second excitation radiation source successively comprises the second dichroic mirror, the second focusing device, the predefinable irradiation region, the first focusing device and the first dichroic mirror.

2. The light module as claimed in claim 1, wherein the respective optical path one of the two dichroic mirrors is impinged on transmissively, and the other reflectively.

3. The light module as claimed in claim 1, wherein the first and the second excitation radiation, on the one hand, and the first and the second conversion radiation at the output run at an angle of ≤10° with respect to the optical axis.

4. The light module as claimed in claim 1, wherein the first focusing device is configured to direct the first excitation radiation onto the predefinable irradiation region at a predefinable angular range and to deflect the second conversion radiation such that it impinges on the first dichroic mirror at an angle of 45°, and
wherein the second focusing device is configured to direct the second excitation radiation onto the predefinable irradiation region at the predefinable angular range, but with an opposite sign, and to deflect the first conversion radiation such that it impinges on the second dichroic mirror at an angle of 45°.

5. The light module as claimed in claim 1, wherein the first dichroic mirror is arranged in a manner tilted by 45° relative to the beam path of the first excitation radiation emitted by the first excitation radiation source, and
wherein the second dichroic mirror is arranged in a manner tilted by 45° relative to the beam path of the second excitation radiation emitted by the second excitation radiation source.

6. The light module as claimed in claim 1, wherein a first coating of the first dichroic mirror is adapted to transmit the first excitation radiation and to reflect the second excitation radiation,
wherein a second coating of the first dichroic mirror is adapted to reflect the second conversion radiation and the second excitation radiation,
wherein the first coating of the second dichroic mirror is adapted to transmit the second excitation radiation and to reflect the first excitation radiation, and
wherein a second coating of the second dichroic mirror is adapted to reflect the first conversion radiation and the first excitation radiation.

7. The light module as claimed in claim 6, wherein the first and/or the second dichroic mirror have/has a scattering structure on the first side and/or the second side.

8. The light module as claimed in claim 1, wherein a first coating of the first dichroic mirror is adapted to reflect the first excitation radiation and to transmit the second excitation radiation,
wherein a second coating of the first dichroic mirror is adapted to transmit the second conversion radiation and the second excitation radiation,
wherein the first coating of the second dichroic mirror is adapted to reflect the second excitation radiation and to transmit the first excitation radiation, and
wherein a second coating of the second dichroic mirror is adapted to transmit the first conversion radiation and the first excitation radiation.

9. The light module as claimed in claim 1, wherein the at least one optical property constitutes the wavelength and/or the polarization.

10. The light module as claimed in claim 1, wherein the first and second dichroic mirrors are embodied in an integral fashion and constitute different regions of one and the same dichroic mirror.

* * * * *